US012424185B2

(12) United States Patent
Katsuta

(10) Patent No.: US 12,424,185 B2
(45) Date of Patent: Sep. 23, 2025

(54) DISPLAY DEVICE

(71) Applicant: Magnolia White Corporation, Tokyo (JP)

(72) Inventor: Tadayoshi Katsuta, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/771,601

(22) Filed: Jul. 12, 2024

(65) Prior Publication Data

US 2025/0029573 A1 Jan. 23, 2025

(30) Foreign Application Priority Data

Jul. 20, 2023 (JP) ................................. 2023-118664

(51) Int. Cl.
*G09G 3/36* (2006.01)

(52) U.S. Cl.
CPC ... *G09G 3/3677* (2013.01); *G09G 2310/0291* (2013.01)

(58) Field of Classification Search
CPC ......... G09G 2310/0297; G09G 3/3648; G09G 3/3688
See application file for complete search history.

(56) References Cited

U.S. PATENT DOCUMENTS

| | | | | |
|---|---|---|---|---|
| 11,302,620 | B2 * | 4/2022 | Jang | H01L 23/49866 |
| 2009/0174083 | A1 * | 7/2009 | Sunohara | H05K 3/4007 257/E23.141 |
| 2009/0231261 | A1 | 9/2009 | Matsumoto et al. | |
| 2009/0231324 | A1 | 9/2009 | Kotani et al. | |
| 2013/0307839 | A1 | 11/2013 | Kotani et al. | |
| 2015/0145822 | A1 * | 5/2015 | Katsuta | G06F 3/04184 345/174 |
| 2018/0217466 | A1 * | 8/2018 | Nomura | G02F 1/136286 |
| 2020/0091270 | A1 * | 3/2020 | Jang | H05K 3/244 |
| 2025/0029573 | A1 * | 1/2025 | Katsuta | G09G 3/3677 |

FOREIGN PATENT DOCUMENTS

| | | |
|---|---|---|
| JP | 2009-192928 A | 8/2009 |
| JP | 2009-216997 A | 9/2009 |

* cited by examiner

*Primary Examiner* — Van N Chow
(74) *Attorney, Agent, or Firm* — K&L Gates LLP

(57) ABSTRACT

A display device includes a substrate having a display region in which a plurality of pixels are arrayed in a first direction and a second direction different from the first direction, a plurality of scanning lines coupled to the pixels arrayed in the first direction, a plurality of signal lines coupled to the pixels arrayed in the second direction, a gate driver configured to supply a scanning signal to the scanning lines in a selection period of the scanning lines, a signal line selection circuit configured to supply a pixel signal to the signal lines in a selection period of the signal lines, and a driver IC.

2 Claims, 13 Drawing Sheets

DISPLAY DEVICE

CROSS-REFERENCE TO RELATED APPLICATION

This application claims the benefit of priority from Japanese Patent Application No. 2023-118664 filed on Jul. 20, 2023, the entire contents of which are incorporated herein by reference.

BACKGROUND

1. Technical Field

The present invention relates to a display device.

2. Description of the Related Art

Conventionally disclosed are display devices with a signal line selective drive system in which control lines are provided at the center of a substrate, for example, to reduce the wiring resistance of control signals to an analog switch circuit (signal line selection circuit) (e.g., Japanese Patent Application Laid-open Publication No. 2009-192928 (JP-A-2009-192928)). Also disclosed is a configuration in which a plurality of distribution circuits (signal line selection circuits) are provided, and control signals are supplied to both ends of each distribution circuit to reduce waveform rounding of the control signals (e.g., Japanese Patent Application Laid-open Publication No. 2009-216997 (JP-A-2009-216997)).

In the technique disclosed in JP-A-2009-192928, the control lines provided at the center extend in both end directions, whereby the wiring resistance becomes larger closer to both ends. As a result, voltage drop and delay and attenuation of the control signals due to the wiring resistance may not be sufficiently suppressed.

There has recently been a demand for a display panel with higher definition for a configuration that magnifies a display image by a lens, such as virtual reality (VR), augmented reality (AR), and mixed reality (MR). In the technique disclosed in JP-A-2009-216997, the control signal lines are coupled to both ends of each distribution circuit, whereby the number of control signal lines provided between the distribution circuits is increased. As a result, the space between the distribution circuits is larger than the space between the pixels, and a plurality of regions of the display panel divided for each distribution circuit may possibly be visually recognized.

An object of the present invention is to provide a display device with higher definition.

SUMMARY

A display device according to an embodiment of the present disclosure includes a substrate having a display region in which a plurality of pixels are arrayed in a first direction and a second direction different from the first direction, a plurality of scanning lines coupled to the pixels arrayed in the first direction, a plurality of signal lines coupled to the pixels arrayed in the second direction, a gate driver configured to supply a scanning signal to the scanning lines in a selection period of the scanning lines, a signal line selection circuit configured to supply a pixel signal to the signal lines in a selection period of the signal lines, and a driver IC configured to generate a plurality of image signals obtained by time-division multiplexing the pixel signal supplied to each of the signal lines and supply the image signals to the signal line selection circuit and to supply a selection control signal of the signal lines to the signal line selection circuit. The driver IC is mounted on the substrate along the signal line selection circuit, the selection control signal is output from buffer circuits provided at both ends of the driver IC in the first direction, the signal line selection circuit is provided with a plurality of switch circuits configured to select one of the signal lines and arrayed in the first direction on the substrate, and wiring configured to supply the selection control signal to the signal line selection circuit includes first wiring to which the switch circuits are coupled in the first direction, second wiring provided substantially parallel to the first wiring, both ends of the second wiring being coupled to the respective buffer circuits, and a plurality of third wires coupled to the second wiring at a plurality of positions including at least both ends and the center of the first wiring.

DETAILED DESCRIPTION

Figure 1:
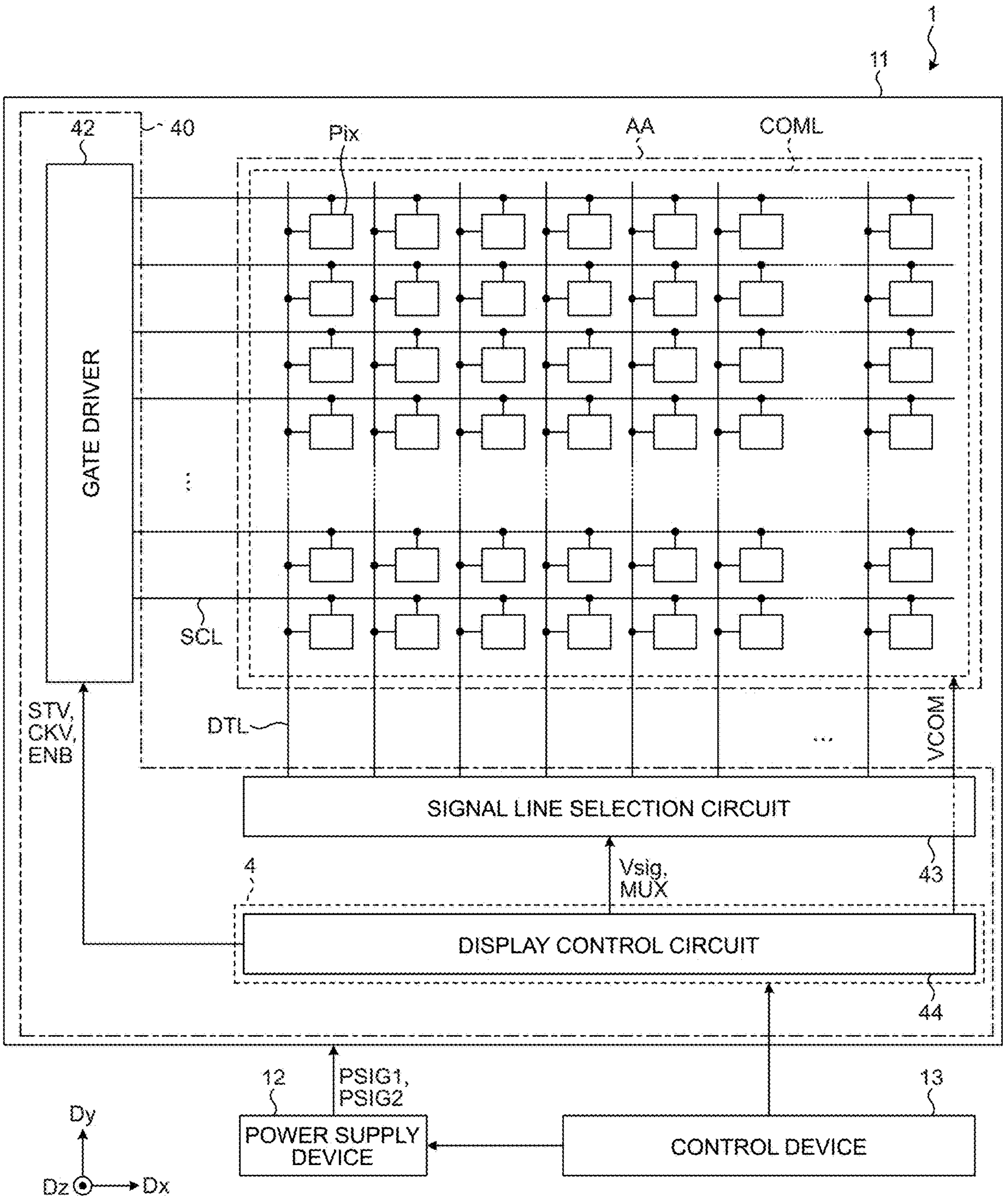
FIG. 1 is a diagram of an example of a schematic configuration of a display device.

Exemplary aspects (embodiments) to embody the present invention are described below in greater detail with reference to the accompanying drawings. The contents described in the embodiments below are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present invention. To simplify the explanation, the drawings may possibly illustrate the width, the thickness, the shape, and other elements of each unit more schematically than the actual aspect. These elements, however, are given by way of example only and are not intended to limit interpretation of the present invention. In the present specification and the drawings, components similar to those previously described with reference to previous drawings are denoted by like reference numerals, and detailed explanation thereof may be appropriately omitted.

Figure 2:
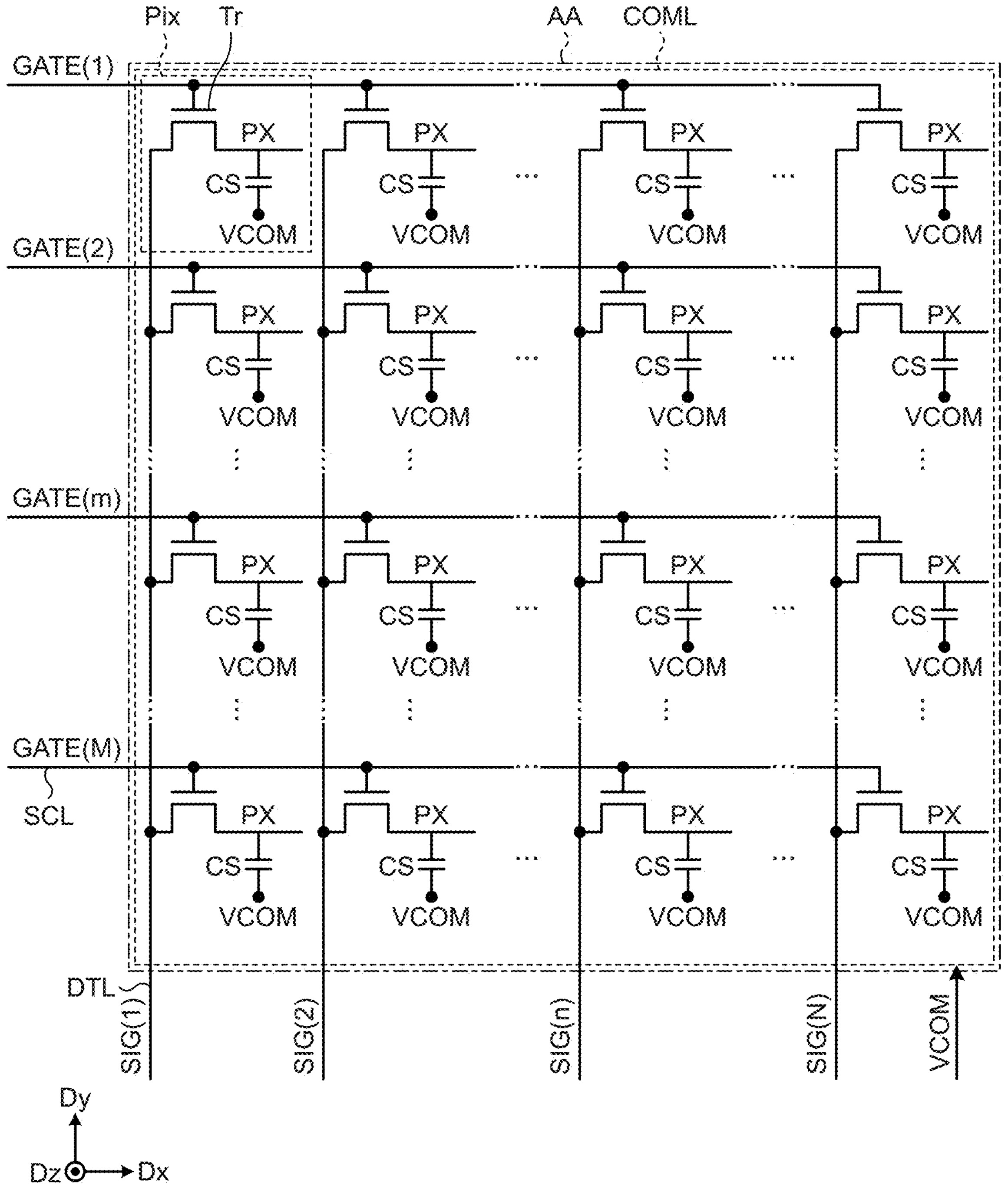
FIG. 2 is a diagram of an example of a pixel array in a display region.

FIG. 1 is a diagram of an example of a schematic configuration of a display device. FIG. 2 is a diagram of an example of a pixel array in a display region.

A display device 1 according to the present embodiment is a liquid crystal display device provided with liquid crystal display elements as display elements, for example. The display device 1 according to the present disclosure can employ a column inversion driving method or a frame inversion driving method, for example, as a driving method. The driving method in the display device 1 is not limited to the column inversion driving method or the frame inversion driving method.

The display device 1 has a display region AA on a display panel 11 and is provided with a drive circuit 40 in a peripheral region of the display region AA. The display device 1 is supplied with electric power from a power supply device 12.

The drive circuit 40 includes a gate driver 42, a signal line selection circuit 43, and a display control circuit 44. The gate driver 42 and the signal line selection circuit 43 are thin-film transistor (TFT) circuits formed in the peripheral region of the display region AA. The display control circuit 44 is included in a driver IC 4 mounted on the peripheral region of the display region AA. The driver IC 4 is coupled to a control device 13 via a relay substrate composed of flexible printed circuits (FPC), for example.

The control device 13 controls power supply from the power supply device 12 to the display device 1. The control device 13 also controls turning-on and -off of the display device 1. The power supply device 12 and the control device 13 are mounted on a device (not illustrated) on which the display device 1 is mounted, for example.

The display region AA is provided with a plurality of pixels Pix aligned in a Dx direction (first direction) and a Dy direction (second direction). The display region AA is also provided with scanning lines (gate lines) SCL, signal lines DTL, and a common electrode COML. The scanning line SCL supplies scanning signals (gate signals) GATE to the pixels Pix. The signal line DTL supplies pixel signals SIG to the pixels Pix. The common electrode COML supplies a common potential VCOM to the pixels Pix. The scanning line SCL according to the present embodiment extends in the Dx direction (first direction). The signal line DTL according to the present embodiment extends in the Dy direction (second direction).

As illustrated in FIG. 2, the pixels Pix each include a pixel transistor Tr and a pixel electrode PX. The pixel transistor Tr is composed of a thin-film transistor (TFT) and is composed of, for example, an n-channel metal oxide semiconductor (MOS) TFT (hereinafter also referred to as "n-type TFT"). The source of the pixel transistor Tr is coupled to the signal line DTL, the gate thereof is coupled to the scanning line (gate line) SCL, and the drain thereof is coupled to the pixel electrode PX. A holding capacitance CS is formed between the pixel electrode PX and the common electrode COML.

The gates of the pixel transistors Tr of the pixel Pix arrayed in the Dx direction (first direction) are supplied with the scanning signals (gate signals) GATE (1, 2, . . . , m, . . . , and M) via the scanning lines (gate lines) SCL. The sources of the pixel transistors Tr of the pixels Pix arrayed in the Dy direction (second direction) are supplied with the pixel signals SIG (1, 2, . . . , n, . . . , and N) via the signal lines DTL. While N pixels Pix are arrayed in the Dx direction (first direction), and M pixels Pix are arrayed in the Dy direction (second direction) in the example illustrated in FIG. 2, the present disclosure is not limited thereto. In the following description, the row in which the pixels Pix are arrayed in the Dx direction (first direction) is also referred to as a pixel row. The column in which the pixels Pix are arrayed in the Dy direction (second direction) is also referred to as a pixel column.

The pixels Pix according to the present disclosure include, for example, red pixels for displaying red (R), green pixels for displaying green (G), and blue pixels for displaying blue (B). While the pixel array is a stripe array in which RGB pixels are arrayed in the Dx direction (first direction), for example, it is not limited to the RGB stripe array. Specifically, for example, white pixels for displaying white (W) may be provided as the pixels Pix. Alternatively, a diagonal stripe array having a predetermined angle to the Dx direction (first direction) or the Dy direction (second direction) may be employed. Still alternatively, a plurality of pixel groups that display different colors may be periodically arranged in both the Dx direction (first direction) and the Dy direction (second direction).

The power supply device 12 generates a positive first power supply voltage signal PSIG1 and a negative second power supply voltage signal PSIG2 to be supplied to the display device 1. The first power supply voltage signal PSIG1 is controlled at a first potential (VGH). The second power supply voltage signal PSIG2 is controlled at a second potential (VGL) lower than the first potential (VGH). The first potential (VGH) is set to 6 V, for example. The second potential (VGL) is set to −6 V, for example. The first potential (VGH) is not limited to 6 V. The second potential (VGL) is not limited to −6 V.

The control device 13 transmits video signals serving as the original signals of video to be displayed on the display device 1 to the display device 1. The control device 13 also transmits control signals to the display device 1 to control the display device 1. The control device 13 also transmits control signals to the power supply device 12 to control power supply from the power supply device 12 to the display device 1.

The control device 13 includes, for example, a central processing unit (CPU) and a storage device, such as a memory. The control device 13 can implement display functions of the display device 1 by executing computer programs using these hardware resources, such as the CPU and the storage device. The control device 13 performs control such that the driver IC 4 can handle an image to be displayed on the display device 1 as image input gradation information according to the execution results of the computer programs.

The display control circuit 44 controls the display operation in the display region AA by controlling the gate driver 42 and the signal line selection circuit 43. The display control circuit 44 receives video signals and various control signals from the control device 13. The display control circuit 44 converts the video signals received from the control device 13 into image signals Vsig and outputs them. The image signal Vsig is a signal obtained by time-division multiplexing the pixel signal SIG according to the RGB pixel array, for example. The display control circuit 44 also supplies the common potential VCOM to the common electrode COML.

The display control circuit 44 also functions as an interface (I/F) and a timing generator between the signal line selection circuit 43 and the control device 13.

Figure 3:
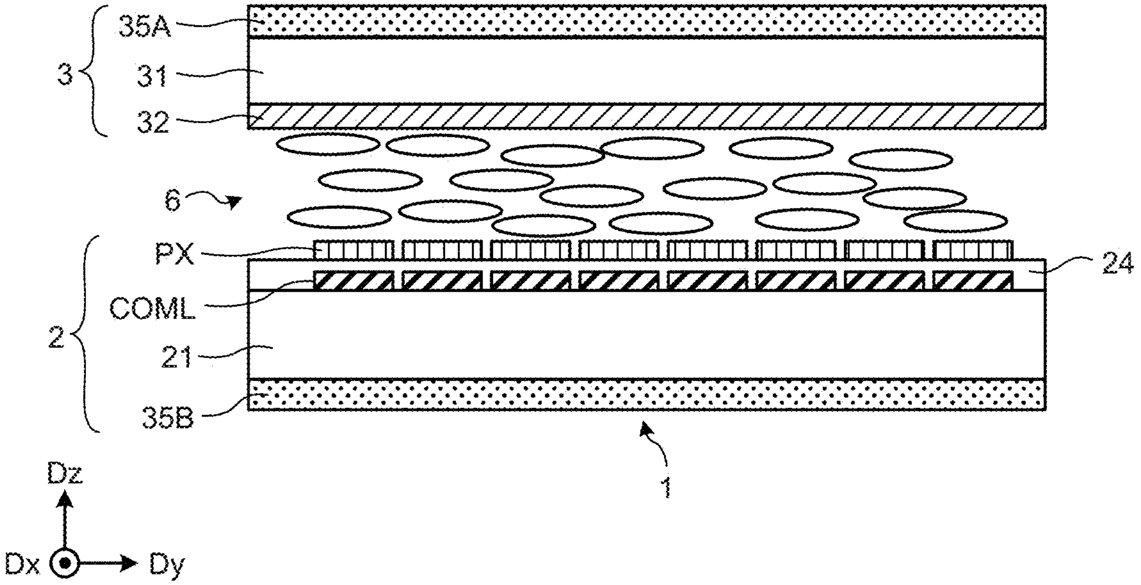
FIG. 3 is a sectional view of a schematic sectional structure of the display device.
Figure 4:
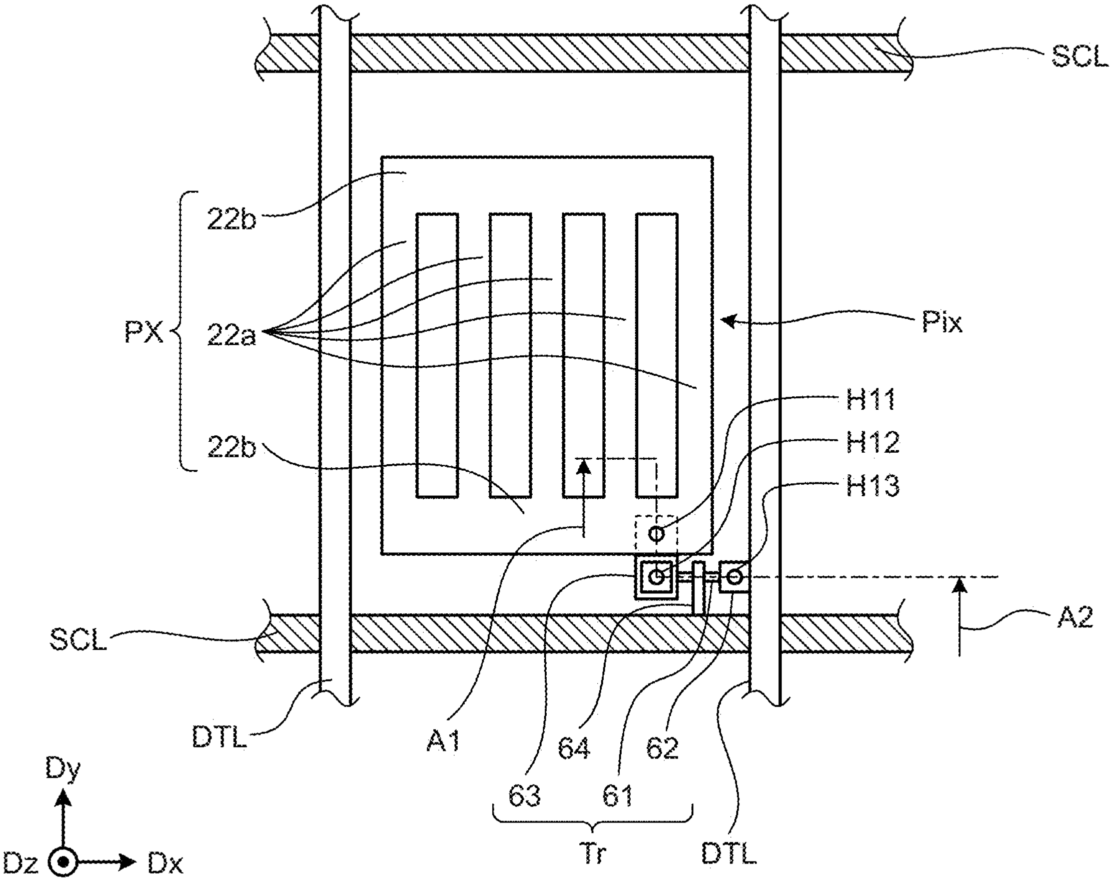
FIG. 4 is a plan view of an exemplary configuration of a pixel.
Figure 5A:
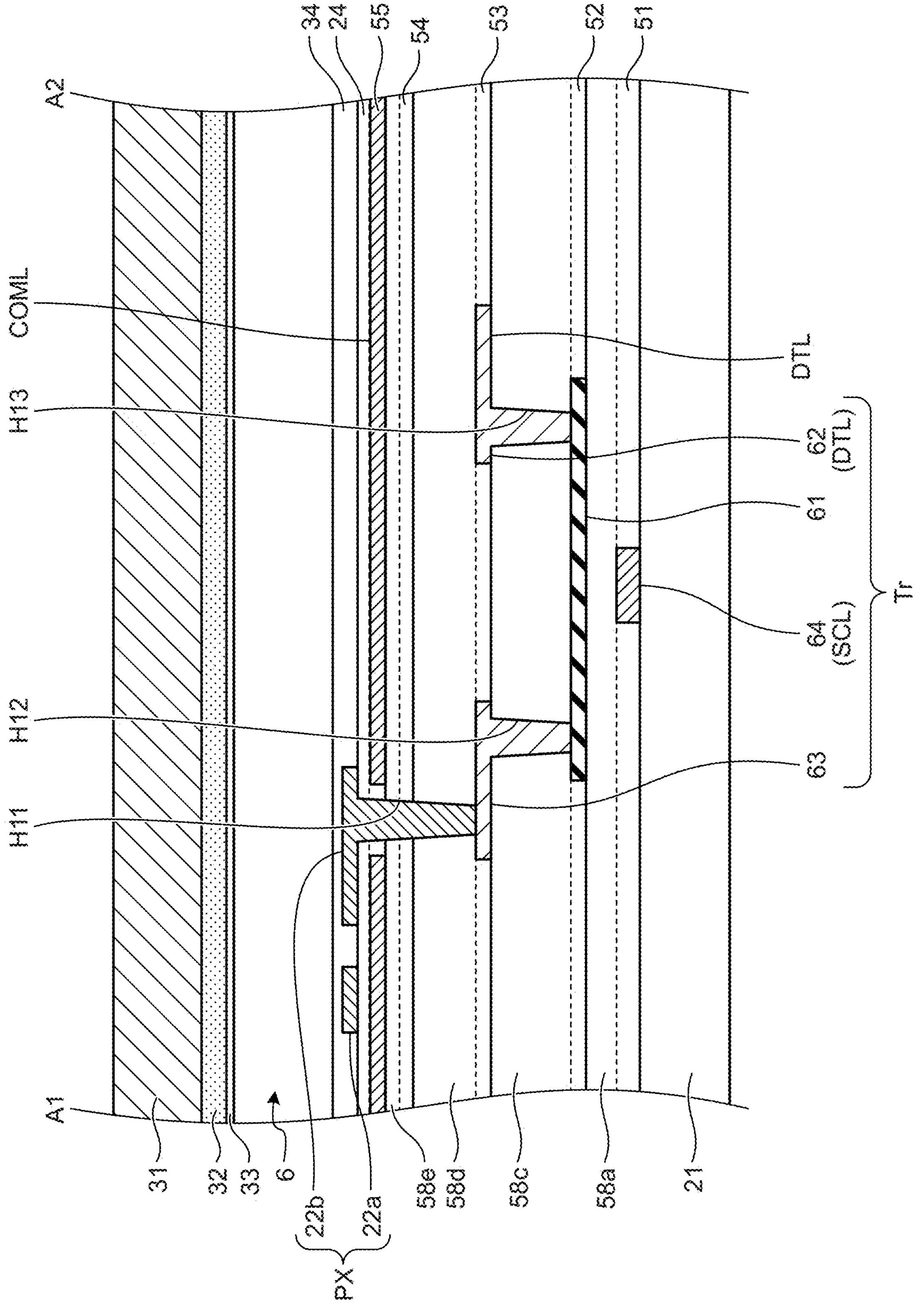
FIG. 5A is a schematic of a first example of a section along line A1-A2 of FIG. 4.
Figure 5B:
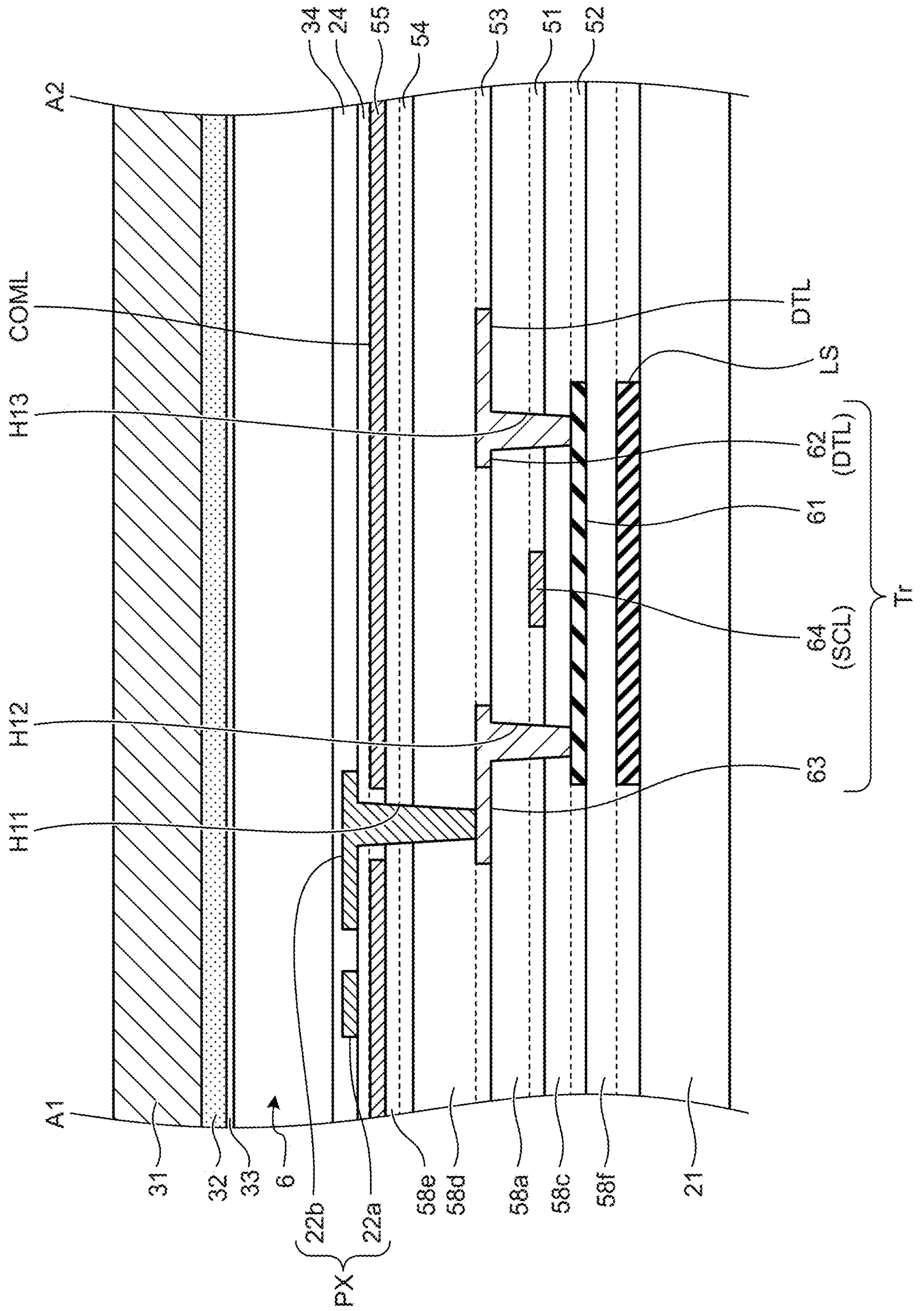
FIG. 5B is a schematic of a second example of the section along line A1-A2 of FIG. 4.

Next, a schematic structure of the display device 1 according to the embodiment is described with reference to FIGS. 3 to 5B. FIG. 3 is a sectional view of a schematic sectional structure of the display device. FIG. 4 is a plan view of an exemplary configuration of the pixel. FIG. 5A is a schematic of a first example of a section along line A1-A2 of FIG. 4. In the first example illustrated in FIG. 5A, a bottom-gate transistor is used as the pixel transistor Tr. FIG. 5B is a schematic of a second example of the section along line A1-A2 of FIG. 4. In the second example illustrated in FIG. 5B, a top-gate transistor is used as the pixel transistor Tr.

An array substrate 2 includes a first substrate 21 made of glass or transparent resin, a plurality of pixel electrodes PX, the common electrode COML, and an insulating layer 24 that insulates the pixel electrodes PX from the common electrode COML. The pixel electrodes PX are disposed on the first substrate 21 in a matrix having a row-column configuration (matrix form), for example. The common electrode COML is provided between the first substrate 21 and the pixel electrodes PX.

The pixel electrodes PX are provided corresponding to the respective pixels Pix. The pixel signal SIG for performing a display operation is supplied from the signal line selection circuit 43 to the pixel electrode PX via the signal line DTL and the pixel transistor Tr. In the display operation, the common potential VCOM for display serving as a voltage signal is supplied from the driver IC 4 to the common electrode COML. The common potential VCOM is preferably a potential different from the GND potential and is approximately −0.7 V, for example. The common potential VCOM is set to the optimum value that does not cause flicker in the driving method, such as the column inversion driving method and the frame inversion driving method. While the common potential VCOM is preferably a fixed potential, it may have a waveform composed of AC square waves.

The pixel electrodes PX and the common electrode COML are made of translucent conductive material, such as indium tin oxide (ITO). A polarizing plate 35B is provided under the first substrate 21 with an adhesive layer (not illustrated) interposed therebetween.

A counter substrate 3 includes a second substrate 31 made of glass or transparent resin, and a color filter 32 and a light-shielding layer (not illustrated) formed on one surface of the second substrate 31. A polarizing plate 35A is provided on the second substrate 31 with an adhesive layer (not illustrated) interposed therebetween.

The array substrate 2 and the counter substrate 3 are disposed facing each other with a predetermined space (cell gap) interposed therebetween. The space between the first substrate 21 and the second substrate 31 is provided with a liquid crystal layer 6 serving as a display function layer. The liquid crystal layer 6 modulates light passing therethrough by changing the orientation state of the liquid crystal molecules for each pixel Pix according to the state of the electric field between each pixel electrode PX and the common electrode COML. The liquid crystal according to the present embodiment is liquid crystal suitable for a lateral electric field mode, such as in-plane switching (IPS) including fringe field switching (FFS).

The array substrate 2 includes the pixel transistors Tr of the respective pixels Pix and wiring, such as the signal lines DTL and the scanning lines (gate lines) SCL. The signal lines DTL supply the pixel signals SIG to the pixel electrodes PX. The scanning lines (gate lines) SCL supply the gate signals GATE to drive the pixel transistors Tr. The signal lines DTL and the scanning lines (gate lines) SCL extend in a plane parallel to the surface of the first substrate 21.

As illustrated in FIG. 4, the region surrounded by the scanning lines (gate lines) SCL and the signal lines DTL is the pixel Pix. The pixel electrode PX includes a plurality of strip electrodes 22*a* and connecting parts 22*b*.

As illustrated in FIG. 4, the pixel transistor Tr includes a semiconductor 61, a source electrode 62, a drain electrode 63, and a gate electrode 64.

As illustrated in FIG. 5A, a gate line layer 51 is provided on the first substrate 21 in the configuration using a bottom-gate transistor as the pixel transistor Tr. The gate line layer 51 is provided with the gate electrode 64 (scanning line (gate line) SCL). An insulating layer 58*a* (second insulating layer) is provided on the first substrate 21 to cover the gate electrode 64. A semiconductor layer 52 is provided on the insulating layer 58*a*. The semiconductor layer 52 is provided with the semiconductor 61. A signal line layer 53 is provided on the semiconductor layer 52 with an insulating layer 58*c* (first insulating layer) interposed therebetween.

As illustrated in FIG. 5B, a light shield LS is provided on the first substrate 21 in the configuration using a top-gate transistor as the pixel transistor Tr. The semiconductor layer 52 is provided on the light shield LS with an insulating layer 58*f* interposed therebetween. The semiconductor layer 52 is provided with the semiconductor 61. The gate line layer 51 is provided on the semiconductor layer 52 with the insulating layer 58*c* interposed therebetween. The gate line layer 51 is provided with the gate electrode 64. The insulating layer 58*a* is provided on the insulation layer 58*c* to cover the gate electrode 64. The signal line layer 53 is provided on the gate line layer 51 with the insulating layer 58*a* interposed therebetween.

The signal line layer 53 is provided with the drain electrode 63 and the source electrode 62 (signal line DTL). An auxiliary wiring layer 54 is provided on the drain electrode 63 and the source electrode 62 (signal line DTL) with an insulating layer 58*d* (third insulating layer) interposed therebetween. A common electrode layer 55 is provided on the auxiliary wiring layer 54 with an insulating layer 58*e* interposed therebetween. The common electrode layer 55 is provided with the common electrode COML. A configuration in which the auxiliary wiring layer and the common electrode layer are stacked without any insulating layer interposed therebetween may be employed. The pixel electrode PX is provided on the common electrode layer 55 with the insulating layer 24 interposed therebetween.

As illustrated in FIG. 4 and FIG. 5A (or FIG. 5B), the pixel electrode PX is coupled to the drain electrode 63 of the pixel transistor Tr through a contact hole H11. The drain electrode 63 is coupled to the semiconductor 61 through a contact hole H12. The semiconductor 61 intersects the gate electrode 64 in plan view. The gate electrode 64 is coupled to the scanning line (gate line) SCL and protrudes from one side of the scanning line (gate line) SCL. The semiconductor 61 extends to the position overlapping the source electrode 62 and is electrically coupled to the source electrode 62 through a contact hole H13. The source electrode 62 is coupled to the signal line DTL and protrudes from one side of the signal line DTL.

The semiconductor 61 can be made of known material, such as polysilicon and oxide semiconductors. For example, the use of a transparent amorphous oxide semiconductor (TAOS) can enhance the ability to hold the voltage for video display for a long time (retention rate) and improve the display quality. In addition, oxide semiconductors including TAOS have low leakage current when the pixel transistor Tr is turned off.

The gate electrode 64 (scanning line (gate line) SCL) is made of aluminum (Al), copper (Cu), silver (Ag), molybdenum (Mo), or an alloy of these metals, for example. The drain electrode 63 and the source electrode 62 (signal line DTL) are made of titanium aluminum (TiAl), which is an alloy of titanium and aluminum, for example.

The insulating layers 24, 58*a*, 58*c*, 58*d*, 58*e*, and 58*f* can be made of known insulating material. A insulating layer 58*b*, for example, can be made of tetra ethyl ortho silicate (TEOS). The insulating layer 58*c*, for example, can be made of a silicon oxide film ($SiO_2$). The insulating layer 58*d* is made of an organic insulating film, such as acrylic. With this structure, the surface provided with the common electrode COML can be flattened.

Similarly to the gate electrode 64 (scanning line (gate line) SCL), the auxiliary wiring layer 54 is made of aluminum (Al), copper (Cu), silver (Ag), molybdenum (Mo), or an alloy of these metals, for example.

Figure 6:
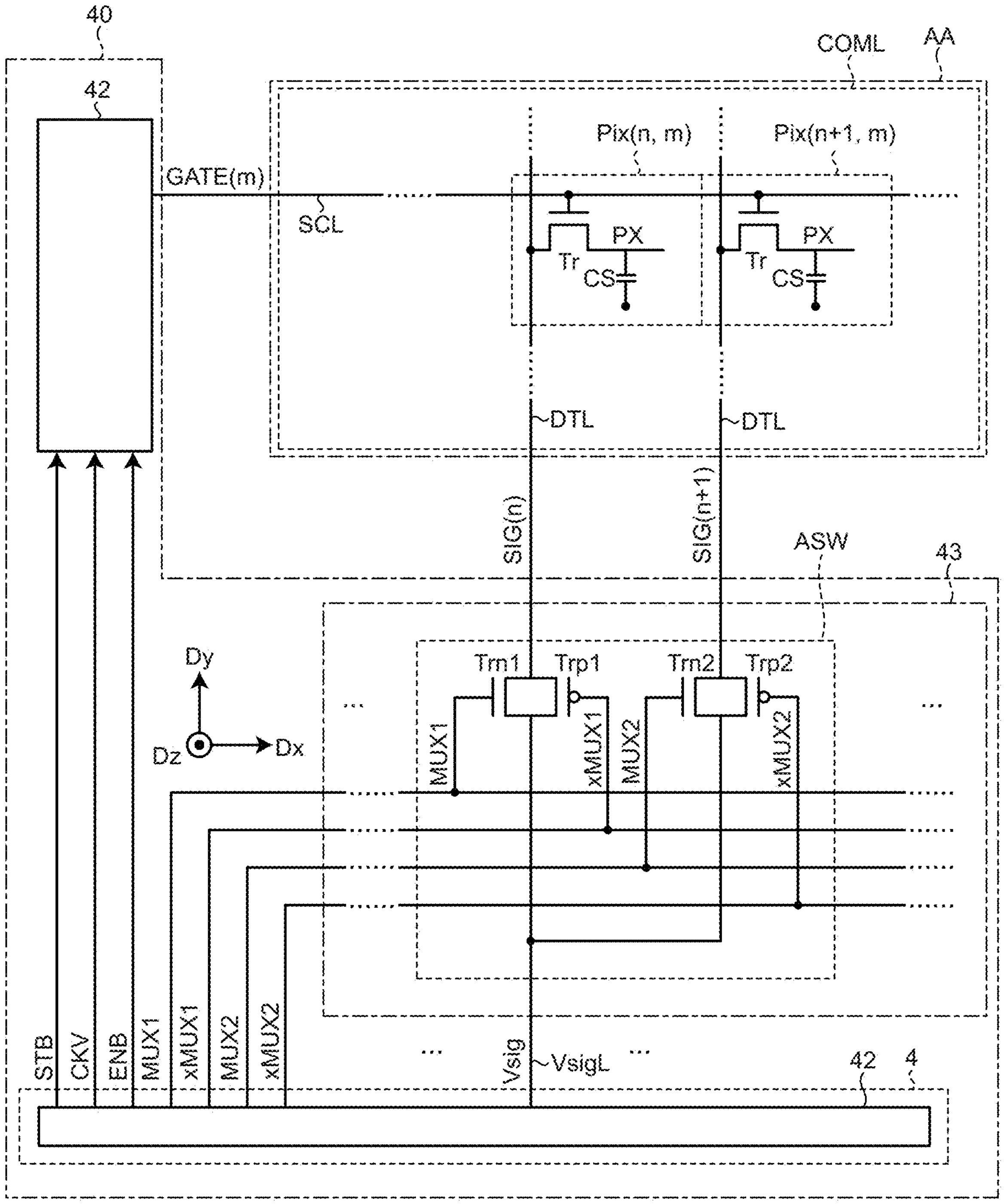
FIG. 6 is a diagram of an example of a drive circuit configuration.

FIG. 6 is a diagram of an example of a drive circuit configuration. FIG. 6 illustrates an exemplary circuit configuration corresponding to the pixel Pix(n, m) and the Pix(n+1, m). The pixel Pix(n, m) represents the n-th pixel Pix from the left in the figure out of the pixels Pix arrayed in the Dx direction (first direction) and the m-th pixel Pix from the top in the figure out of the pixels Pix arrayed in the Dy direction (second direction) in the pixel array illustrated in FIG. 2. The pixel Pix(n+1, m) represents the n+1-th pixel Pix from the left in the figure out of the pixels Pix arrayed in the Dx direction (first direction) and the m-th pixel Pix from the top in the figure out of the pixels Pix arrayed in the Dy direction (second direction) in the pixel array illustrated in FIG. 2.

The circuit elements constituting the drive circuit 40 operate by being supplied with the first power supply voltage signal PSIG1 and the second power supply voltage signal PSIG2 from the power supply device 12. The potential (first potential VGH) of the first power supply voltage signal PSIG1 is a high potential of the scanning signal (gate signal) GATE(m) supplied to the gate of the pixel transistor Tr. The potential (second potential VGL) of the second power supply voltage signal PSIG2 is a low potential of the scanning signal GATE(m) supplied to the gate of the pixel transistor Tr.

The display control circuit 44 (driver IC 4) controls the gate driver 42 and the signal line selection circuit 43. Specifically, the display control circuit 44 (driver IC 4) supplies synchronization signals, such as a start pulse STV and a shift clock CKV, and a scanning line drive signal ENB to the gate driver 42. The display control circuit 44 (driver IC 4) supplies selection control signals MUX to the signal line selection circuit 43. The potential (first potential VGH) of the first power supply voltage signal PSIG1 is a high potential of the selection control signal MUX, for example. The potential (second potential VGL) of the second power supply voltage signal PSIG2 is a low potential of the selection control signal MUX, for example. The present disclosure is not limited by the potential of the selection control signal MUX.

The gate driver 42 is a circuit that generates a scanning signal GATE(m) to be supplied to the gate of the pixel transistor Tr based on the start pulse STV, the shift clock CKV, and the scanning line drive signal ENB output from the display control circuit 44 (driver IC 4).

Specifically, the scanning signal GATE(m) is set to the high potential (first potential VGH) in the selection period of the scanning line SCL coupled to the m-th pixel row. As a result, the pixel transistors Tr of the pixels Pix(n, m) and Pix(n+1, m) are controlled to be turned on.

The scanning signal GATE(m) is set to the low potential (second potential VGL) in the non-selection period of the scanning line SCL coupled to the m-th pixel row. As a result, the pixel transistors Tr of the pixels Pix(n, m) and Pix(n+1, m) are controlled to be turned off.

The signal line selection circuit 43 includes a switch circuit ASW that supplies a pixel signal SIG(n) to the pixel Pix(n, m) and a pixel signal SIG(n+1) to the pixel Pix(n+1, m) by time-dividing the selection period of the scanning line SCL coupled to the m-th pixel row. In the example illustrated in FIG. 6, the switch circuit ASW includes switch transistors Trn1 and Trn2 composed of n-type TFTs and switch transistors Trp1 and Trp2 composed of p-type TFTs.

In the signal line selection circuit 43, a plurality of switch circuits ASW are arrayed in the Dx direction (first direction) on the array substrate 2. In FIG. 6, the selection period of the scanning line SCL coupled to the m-th pixel row is divided into two periods, and the pixel signals SIG(n) and SIG(n+1) are selectively output in the selection periods of the pixel Pix(n, m) and the pixel Pix(n+1, m), respectively. In this configuration, the total number of switch circuits ASW arrayed in the Dx direction (first direction) is N/2.

Specifically, in the selection period of the signal line DTL coupled to the pixel Pix(n, m), the selection control signal MUX1 is set to the high potential (first potential VGH), and the selection control signal xMUX1 is set to the low potential (second potential VGL). As a result, the switch transistors Trn1 and Trp1 are controlled to be turned on, and the image signal Vsig output from the display control circuit 44 (driver IC 4) is selectively output as the pixel signal SIG(n).

In the selection period of the signal line DTL coupled to the pixel Pix(n+1, m), the selection control signal MUX2 is set to the high potential (first potential VGH), and the selection control signal xMUX2 is set to the low potential (second potential VGL). As a result, the switch transistors Trn2 and Trp2 are controlled to be turned on, and the image signal Vsig output from the display control circuit 44 (driver IC 4) is selectively output as the pixel signal SIG(n+1).

In FIG. 6, the switch circuit ASW with the CMOS configuration is illustrated as an example, the present disclosure is not limited thereto. The switch circuit ASW may be composed only of n-type TFTs or p-type TFTs, for example.

In FIG. 6, the selection period of the scanning line SCL coupled to the m-th pixel row is divided into two periods, and the pixel signals SIG(n) and SIG(n+1) are selectively output in the selection periods of the pixel Pix(n, m) and the pixel Pix(n+1, m), respectively, but the present disclosure is not limited thereto. For example, the selection period of the scanning line SCL coupled to the m-th pixel row may be divided into three or more periods, and the corresponding pixel signal SIG may be selectively output in the selection period of each pixel Pix.

Figure 7:
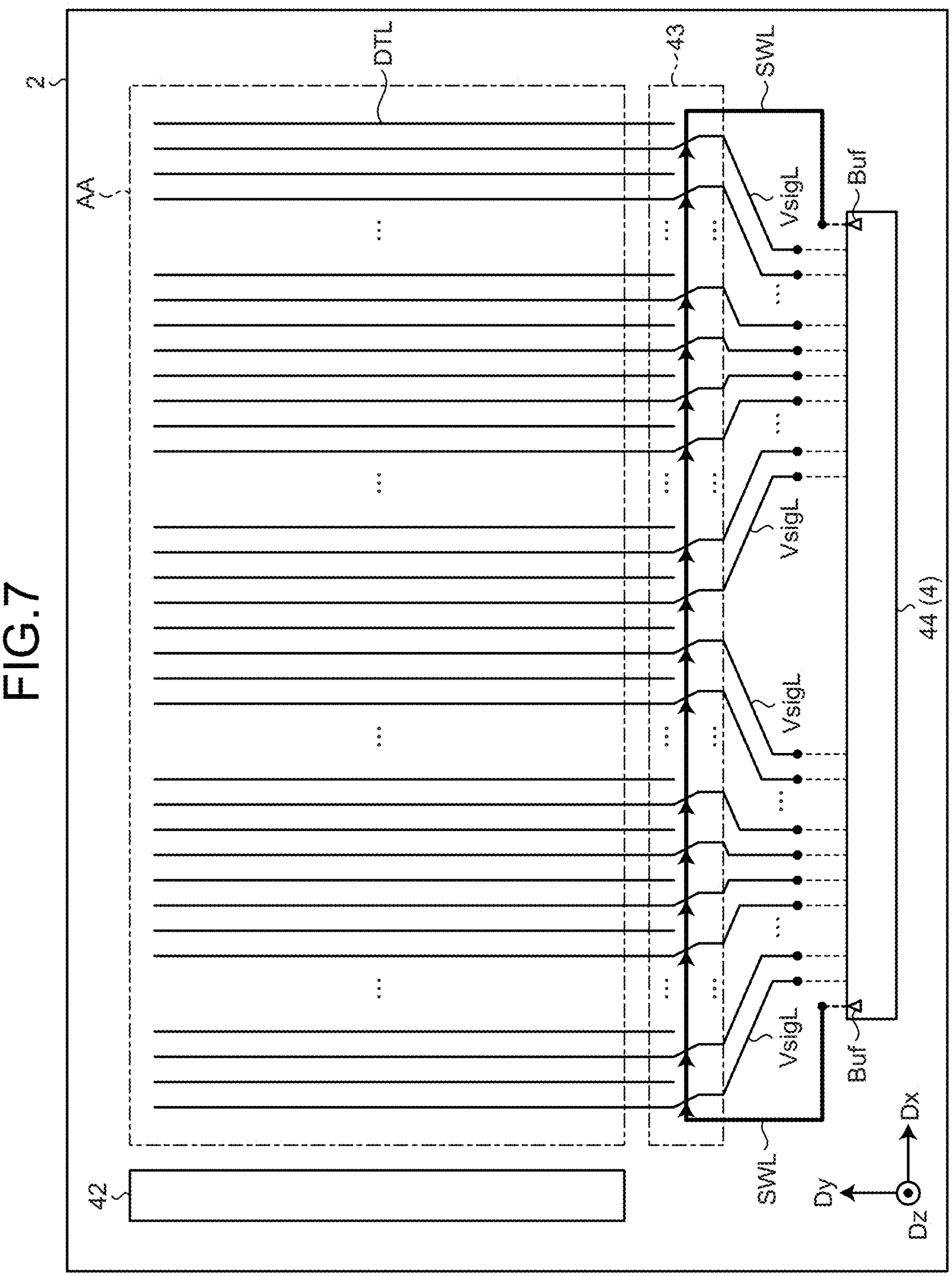
FIG. 7 is a substrate schematic diagram illustrating a coupling example of a selection control line according to a conventional example.

FIG. 7 is a substrate schematic diagram illustrating a coupling example of a selection control line according to a conventional example. In the following description, a plurality of wires that transmit the selection control signals MUX1, xMUX1, MUX2, and xMUX2 are collectively denoted as a selection control line SWL to simplify the explanation.

In FIG. 7, the solid lines represent the wiring (the signal lines DTL, image signal lines VsigL, and the selection control line SWL) in the signal line layer 53 (first metal layer) on the array substrate 2, and the dashed lines represent the wiring (the image signal lines VsigL and the selection control line SWL) in the gate line layer 51 (second metal layer) on the array substrate 2. The wiring on the signal line layer 53 (first metal layer) and the wiring on the gate line layer 51 (second metal layer) are coupled by contact holes represented by black dots. The scanning lines (gate lines) SCL are not illustrated.

As illustrated in FIG. 7, the driver IC 4 is mounted on the array substrate 2 along the signal line selection circuit 43. Output buffer circuits Buf for the selection control signals are typically provided at both ends of the driver IC 4 in the longitudinal direction.

In the coupling example according to the conventional example illustrated in FIG. 7, the selection control line SWL is coupled to both ends of the signal line selection circuit 43 in the Dx direction (first direction).

Figure 8:
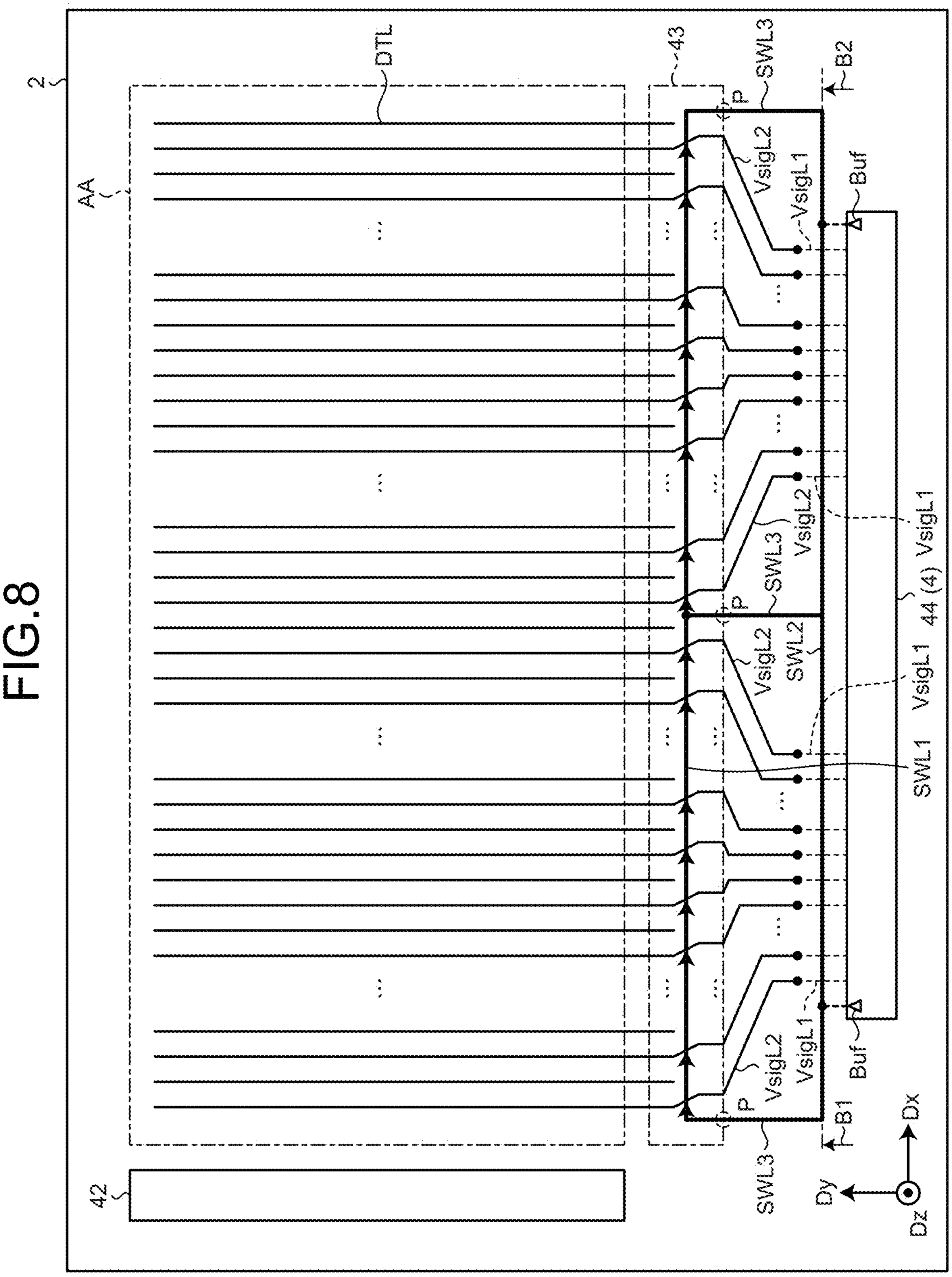
FIG. 8 is a substrate schematic diagram illustrating a coupling example of the selection control line according to an embodiment.
Figure 9:
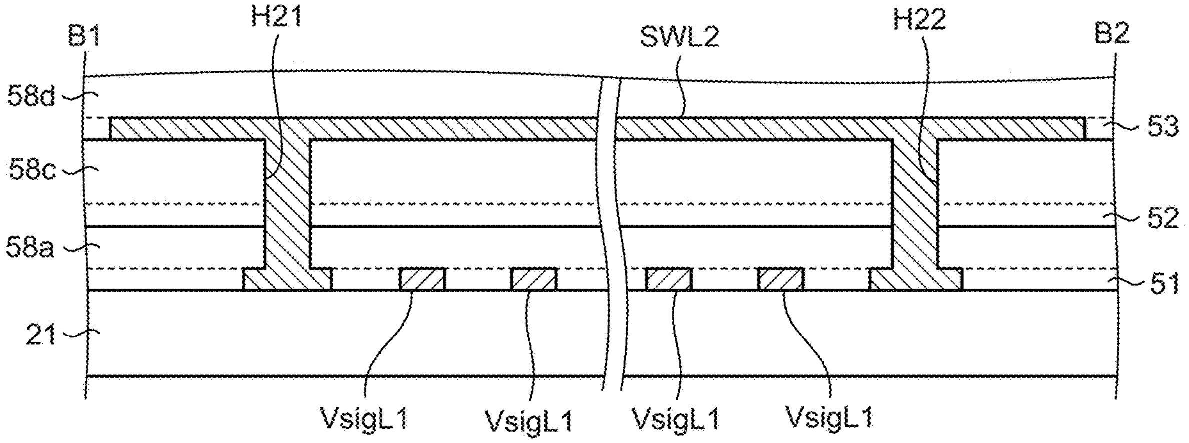
FIG. 9 is a schematic sectional view along line B1-B2 of FIG. 8.

FIG. 8 is a substrate schematic diagram illustrating a coupling example of the selection control line according to the embodiment. FIG. 9 is a schematic sectional view along line B1-B2 of FIG. 8. FIG. 9 illustrates a layer configuration similar to the first example of the pixel section illustrated in FIG. 5A.

In the coupling example of the selection control line according to the embodiment illustrated in FIGS. 8 and 9, the selection control line includes first wiring SWL1, second wiring SWL2, and third wiring SWL3. The first wiring SWL1 couples a plurality of switch circuits ASW of the signal line selection circuit 43 arrayed in the Dx direction (first direction) on the array substrate 2. The second wiring SWL2 is provided substantially parallel to the first wiring SWL1, both ends of the second wiring SWL2 being coupled to the output buffer circuits Buf for the selection control signals provided at both ends of the driver IC 4 in the Dx direction (first direction). The third wiring SWL3 is coupled to the second wiring SWL2 at both ends and the center of the first wiring SWL1. In the coupling example illustrated in FIG. 8, the image signal lines include first image signal lines VsigL1 intersecting the second wiring SWL2 and second image signal lines VsigL2 coupled to the respective switch circuits of the signal line selection circuit 43.

In the coupling example according to the embodiment illustrated in FIG. 8, the first wiring SWL1, the second wiring SWL2, and the third wiring SWL3 are provided in the signal line layer 53 (first metal layer) on the array substrate 2.

In the coupling example according to the embodiment illustrated in FIG. 8, the second wiring SWL2 is coupled at both ends in the Dx direction (first direction) to the output buffer circuits Buf for the selection control signals provided at both ends of the driver IC 4 in the Dx direction (first direction) via contact holes H21 and H22 and the wiring provided in the gate line layer 51 (second metal layer) as illustrated in FIG. 9. As illustrated in FIG. 9, the second wiring SWL2 intersects the first image signal lines VsigL1 provided in the gate line layer 51 (second metal layer) with the insulating layers 58*a* and 58*c* interposed therebetween.

The layer provided with the first wiring SWL1, the second wiring SWL2, and the third wiring SWL3 is not limited to the signal line layer 53 (first metal layer). The first wiring SWL1, the second wiring SWL2, and the third wiring SWL3 simply need to be provided in a metal layer different from the gate line layer 51 (second metal layer).

Figure 10:
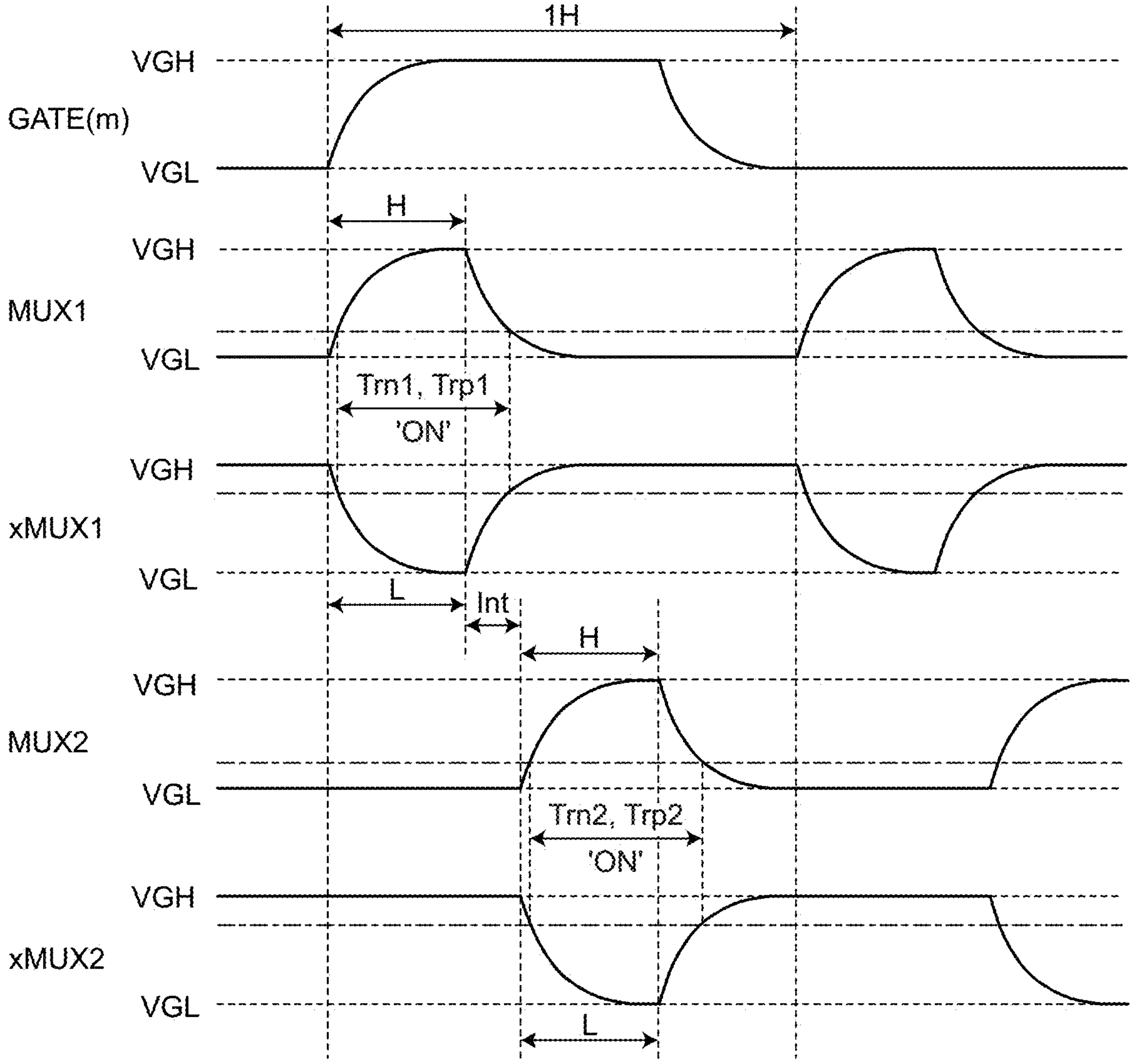
FIG. 10 is a diagram of an example of a selection control signal waveform in the coupling example illustrated in FIG. 7.
Figure 11:
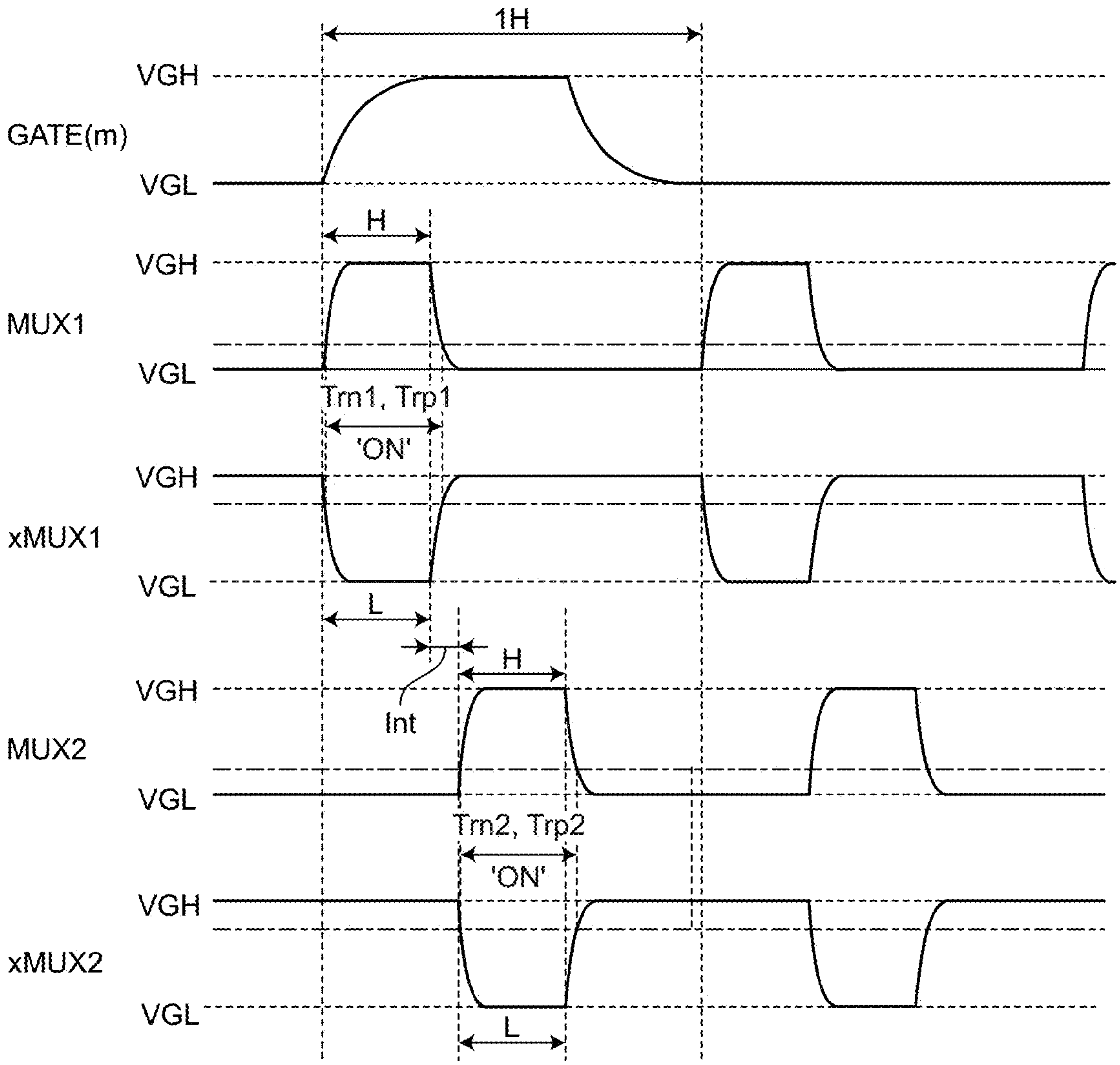
FIG. 11 is a diagram of an example of the selection control signal waveform in the coupling example illustrated in FIG. 8.

FIG. 10 is a diagram of an example of a selection control signal waveform in the coupling example illustrated in FIG. 7. FIG. 11 is a diagram of an example of the selection control signal waveform in the coupling example illustrated in FIG. 8.

The ON timings of the switch transistors Trn1 and Trp1 and the switch transistors Trn2 and Trp2 vary depending on the potential of the pixel signals SIG(n) and SIG(n+1). FIGS. 10 and 11 illustrate an example where the switch transistors Trn1 and Trp1 and the switch transistors Trn2 and Trp2 are turned on in the region where the selection control signals MUX (MUX1, xMUX1, MUX2, and xMUX2) are equal to or higher than the potential indicated by the alternate long and short dash line.

The ON periods of the switch transistors Trn1 and Trp1 and the switch transistors Trn2 and Trp2 are longer than the selection period of the pixel Pix(n, m) (the high period on the control of the selection control signal MUX1 and the low period on the control of the selection control signal xMUX1) and the selection period of the pixel Pix(n+1, m) (the high period on the control of the selection control signal MUX2 and the low period on the control of the selection control signal xMUX2) due to a turn-on time and a turn-off time generated by the impedance of the selection control line SWL. Therefore, it is necessary to provide an interval time Int between the selection period of the pixel Pix(n, m) and the selection period of the pixel Pix(n+1, m) such that the ON period of the switch transistors Trn1 and Trp1 does not overlap that of the switch transistors Trn2 and Trp2.

As illustrated in FIG. 10, in the coupling example illustrated in FIG. 7, the impedance of the selection control line SWL is large, and the turn-on time and the turn-off time of the switch transistors Trn1 and Trp1 and the switch transistors Trn2 and Trp2 are long. Therefore, the substantial ON period of the switch transistors Trn1 and Trp1 is longer than the selection period of the pixel Pix(n, m) (the high period on the control of the selection control signal MUX1 and the low period on the control of the selection control signal xMUX1). The substantial ON period of the switch transistors Trn2 and Trp2 is longer than the selection period of the pixel Pix(n+1, m) (the high period on the control of the selection control signal MUX2 and the low period on the control of the selection control signal xMUX2). As a result, the interval time Int between the selection period of the pixel Pix(n, m) and the selection period of the pixel Pix(n+1, m) needs to be set longer.

In the coupling example of the selection control line SWL according to the embodiment (FIG. 8), the impedance of the selection control line SWL is lower than in the conventional example (FIG. 7) due to an increase in the number of supply points P for supplying the selection control signals to the signal line selection circuit 43. With this configuration, as illustrated in FIG. 11, the turn-on time and the turn-off time of the switch transistors Trn1 and Trp1 and the switch transistors Trn2 and Trp2 can be reduced compared with the conventional example illustrated in FIG. 10. This reduces the substantial ON period of the switch transistors Trn1 and Trp1 corresponding to the selection period of the pixel Pix(n, m) and the substantial ON period of the switch transistors Trn2 and Trp2 corresponding to the selection period of the pixel Pix(n+1, m). As a result, the interval time Int between the selection period of the pixel Pix(n, m) and the selection period of the pixel Pix(n+1, m) can be shortened. The reduction in the turn-on time of the switch transistors Trn1 and Trp1 and the switch transistors Trn2 and Trp2 can reduce the selection period of the pixel Pix(n, m) (the high period on the control of the selection control signal MUX1 and the low period on the control of the selection control signal xMUX1) and the selection period of the pixel Pix(n+1, m) (the high period on the control of the selection control signal MUX2 and the low period on the control of the selection control signal xMUX2). Therefore, the selection period (one horizontal period=1H period) of the scanning line SCL coupled to the m-th pixel row is reduced, thereby enabling higher definition display than in the conventional example at the same frame rate.

Modifications

Figure 12:
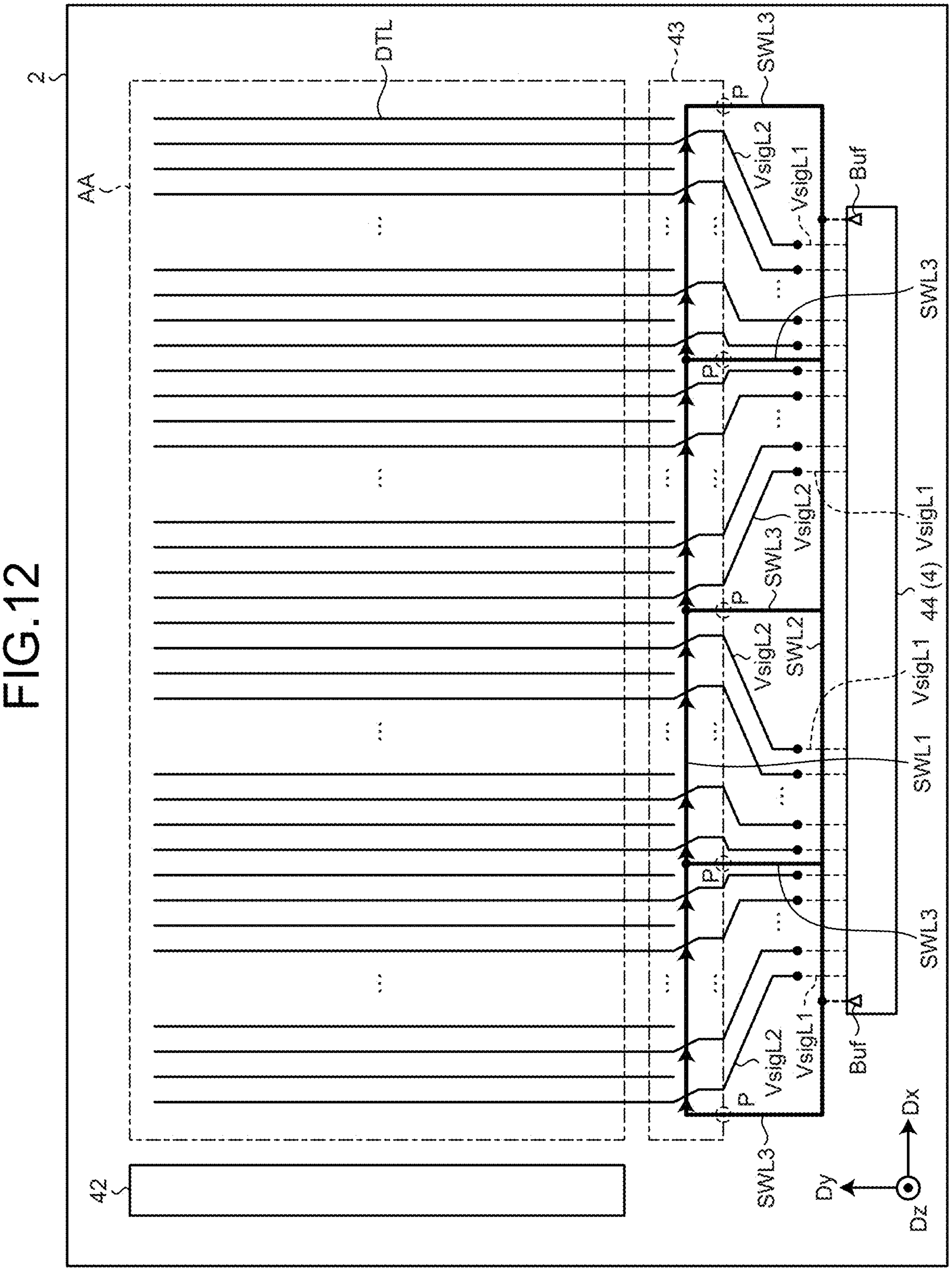
FIG. 12 is a substrate schematic diagram illustrating a coupling example of the selection control line according to a modification of the embodiment.
Figure 13:
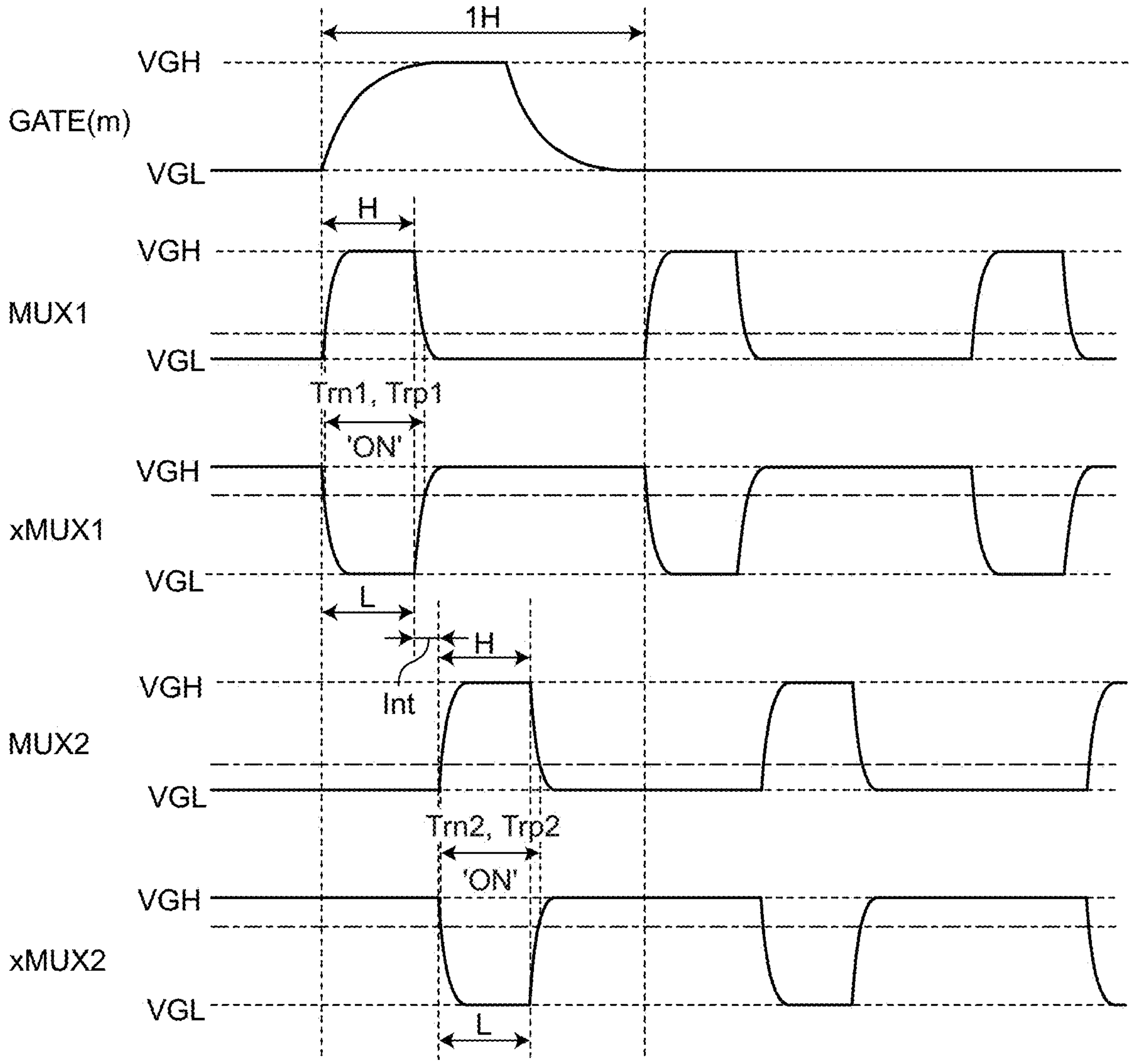
FIG. 13 is a diagram of an example of the selection control signal waveform in the coupling example illustrated in FIG. 12.

FIG. 12 is a substrate schematic diagram illustrating a coupling example of the selection control line according to a modification of the embodiment. FIG. 13 is a diagram of an example of the selection control signal waveform in the coupling example illustrated in FIG. 12.

In the modification illustrated in FIG. 12, the number of supply points P for supplying the selection control signals to the signal line selection circuit 43 is further increased than in FIG. 8. Specifically, in the coupling example of the selection control line according to the modification of the embodiment illustrated in FIG. 12, the selection control line includes the third wiring SWL3 coupled to the second wiring SWL2 at a plurality of positions including both ends and the center of the first wiring SWL1.

With this configuration, as illustrated in FIG. 13, the turn-on time and the turn-off time of the switch transistors Trn1 and Trp1 and the switch transistors Trn2 and Trp2 can be further reduced compared with the coupling example according to the embodiment illustrated in FIG. 11. Therefore, the substantial ON period of the switch transistors Trn1 and Trp1 corresponding to the selection period of the pixel Pix(n, m) and the substantial ON period of the switch transistors Trn2 and Trp2 corresponding to the selection period of the pixel Pix(n+1, m) are further reduced. As a result, the interval time Int between the selection period of the pixel Pix(n, m) and the selection period of the pixel Pix(n+1, m) can be further shortened. The turn-on time of the switch transistors Trn1 and Trp1 and the switch transistors Trn2 and Trp2 is further reduced, whereby the selection period of the pixel Pix(n, m) and the selection period of the pixel Pix(n+1, m) can be further reduced. Therefore, the selection period (one horizontal period=1H period) of the scanning line SCL coupled to the m-th pixel row is further reduced, thereby enabling higher definition display at the same frame rate.

The positions of the supply points P for supplying the selection control signals to the signal line selection circuit 43 and the layer provided with the third wiring SWL3 extending from the second wiring SWL2 to the signal line selection circuit 43 are appropriately determined according to the positions, the wiring conditions, or the like of the display control circuit 44 (driver IC 4) and the signal line selection circuit 43. Specifically, in the coupling example illustrated in FIG. 12, for example, the supply point P for supplying the selection control signals to the signal line selection circuit 43 is preferably provided at a position where the wiring directions differ between adjacent image signal lines VsigL. This configuration can prevent the width between the signal line selection circuit 43 and the driver IC 4 in the Dy direction (second direction) from becoming larger.

The display device 1 is not limited to a liquid crystal display device and may be, for example, an organic EL display provided with organic light-emitting diodes (OLEDs) as the display elements. Alternatively, the display device 1 may be an inorganic EL display provided with inorganic light-emitting diodes (micro LEDs) as the display elements. Still alternatively, the display device 1 may be an electrophoretic display (EPD) or a transparent display that displays images on a transmissive display surface.

While the exemplary embodiments according to the present disclosure have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the present disclosure.

What is claimed is:

1. A display device comprising:
- a substrate having a display region in which a plurality of pixels are arrayed in a first direction and a second direction different from the first direction;
- a plurality of scanning lines coupled to the pixels arrayed in the first direction;
- a plurality of signal lines coupled to the pixels arrayed in the second direction;
- a gate driver configured to supply a scanning signal to the scanning lines in a selection period of the scanning lines;
- a signal line selection circuit configured to supply a pixel signal to the signal lines in a selection period of the signal lines; and
- a driver IC configured to generate a plurality of image signals obtained by time-division multiplexing the pixel signal supplied to each of the signal lines and supply the image signals to the signal line selection circuit and to supply a selection control signal of the signal lines to the signal line selection circuit, wherein
- the driver IC is mounted on the substrate along the signal line selection circuit,
- the selection control signal is output from buffer circuits provided at both ends of the driver IC in the first direction,
- the signal line selection circuit is provided with a plurality of switch circuits configured to select one of the signal lines and arrayed in the first direction on the substrate, and
- wiring configured to supply the selection control signal to the signal line selection circuit comprises:
  - first wiring to which the switch circuits are coupled in the first direction;
  - second wiring provided substantially parallel to the first wiring, both ends of the second wiring being coupled to the respective buffer circuits; and
  - a plurality of third wires coupled to the second wiring at a plurality of positions including at least both ends and the center of the first wiring.

2. The display device according to claim 1, wherein
- the substrate comprises:
  - a first metal layer provided with the signal lines; and
  - a second metal layer different from the first metal layer,
- the first wiring, the second wiring, and the third wires are provided to the first metal layer, and
- wiring configured to supply the image signals to the signal line selection circuit comprises:

a first image signal line provided to the second metal layer and intersecting the second wiring; and a second image signal line provided to the first metal layer and coupled to the switch circuits.

* * * * *